United States Patent [19]

Walker

[11] 4,335,895

[45] Jun. 22, 1982

[54] WHEELED CARRIER FOR SUITCASES AND THE LIKE

[76] Inventor: Brooks Walker, 1280 Columbus Ave., San Francisco, Calif. 94133

[21] Appl. No.: 240,093

[22] Filed: Mar. 3, 1981

Related U.S. Application Data

[63] Continuation of Ser. No. 62,979, Aug. 2, 1979, abandoned.

[51] Int. Cl.³ .............................................. B62B 11/00
[52] U.S. Cl. ................. 280/47.13 R; 280/40; 280/652
[58] Field of Search .......... 280/652, 654, 37, 47.13 R, 280/40, 639

[56] References Cited

U.S. PATENT DOCUMENTS

| | | | |
|---|---|---|---|
| 3,043,603 | 7/1962 | Major, Sr. .............................. | 280/40 |
| 3,241,852 | 3/1966 | Muller et al. .......................... | 280/40 |
| 3,827,707 | 8/1974 | Bierman ................................ | 280/654 |
| 3,960,252 | 6/1976 | Cassimally ........................ | 280/37 X |
| 4,205,863 | 6/1980 | Walker ................................. | 280/652 |

FOREIGN PATENT DOCUMENTS

| | | | |
|---|---|---|---|
| 2213573 | 5/1973 | Fed. Rep. of Germany ...... | 280/646 |
| 1469640 | 4/1977 | United Kingdom ................ | 280/652 |

*Primary Examiner*—Joseph F. Peters, Jr.
*Assistant Examiner*—Donald W. Underwood

[57] ABSTRACT

A wheeled carrier particularly adapted for transporting suitcases and like articles. A support for the article is swingably connected to a wheel mount which in turn carries a pair of ground wheels. The support, the wheel mount and the wheels are adapted to be arranged in coplanar relationship to permit storing the carrier in a relatively small, narrow space when not in use.

5 Claims, 5 Drawing Figures

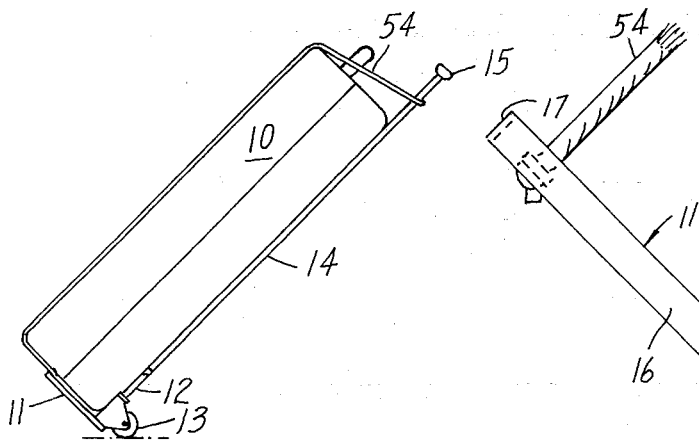
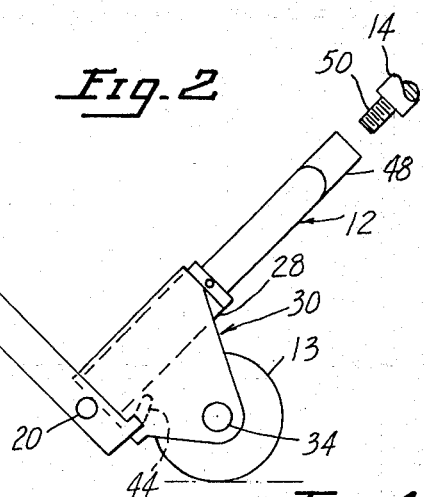
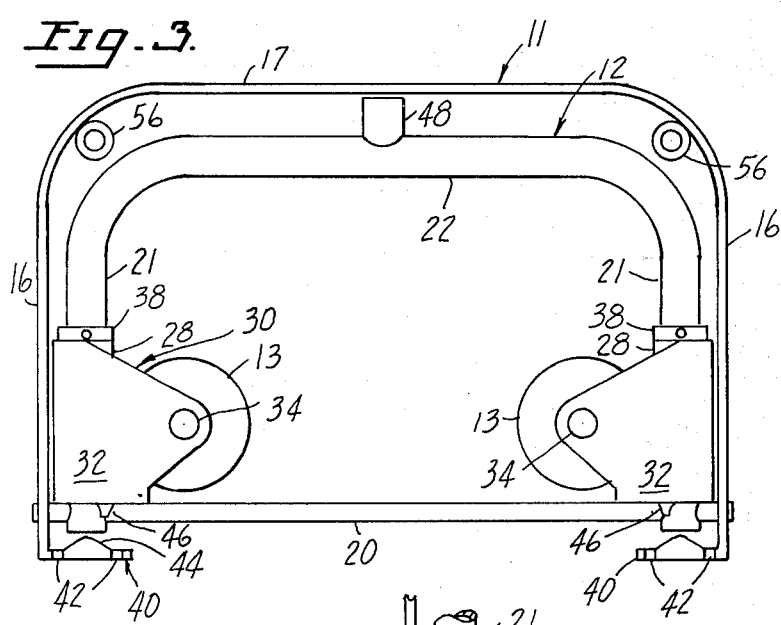
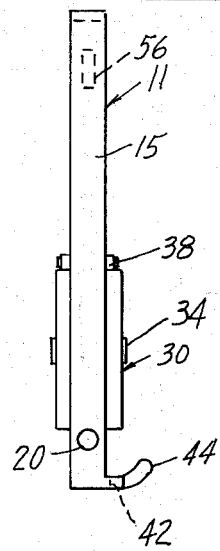
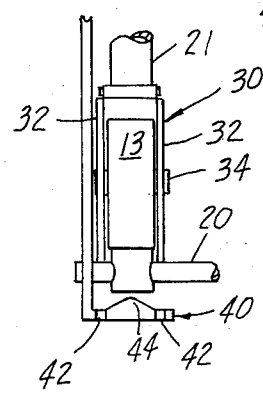

WHEELED CARRIER FOR SUITCASES AND THE LIKE

This is a continuation of application Ser. No. 062,979, filed Aug. 2, 1979, now abandoned.

This invention relates to a wheeled carrier for articles such as suitcases and the like. Heretofore various types of devices have been provided to permit wheeling suitcases and like articles. In some cases a suitcase is provided with permanent wheels but such cases are subject to damage during handling of the suitcase in transit or must be molded into the suitcase and are not suitable for soft side cases. In addition, if the wheels are made relatively small to minimize such damage it becomes difficult to wheel the suitcase on shag rugs, concrete, asphalt and like surfaces.

Readily detachable carrier means have also been provided but in many instances such removable carriers have been relatively bulky, thus defeating their object. In connection with removable carriers it is very desirable to make the same compact enough to fit within the many types of carry-on bags and brief cases which a traveler is permitted to place under the seat of an airplane.

The main object of the present invention is the provision of a novel carrier for suitcases and the like and which carrier may be arranged in an extremely compact condition for thin compact storage while not in use.

Another object of the invention is the provision of a compact suitcase carrier which permits the use of relatively large wheels without increasing the stored bulk of the carrier and thereby permitting use of the carrier on any type of supporting surface, including shag rugs, rough concrete and asphalt.

Other objects and advantages will be apparent from the following specification and from the drawings.

FIG. 1 is a side elevation of the carrier in use with a conventional suitcase.

FIG. 2 is an enlarged side elevation of the carrier arranged for use in carrying the suitcase of FIG. 1.

FIG. 3 is a side elevation of the carrier with its parts arranged in stored condition.

FIG. 4 is an end elevation of the carrier FIG. 3.

FIG. 5 is a fragmentary view of the left hand side of FIG. 3 showing the wheel and its fitting in its outer suitcase carrying position before the parts are arranged in the working position of FIG. 2.

In detail, and first with reference to FIG. 1, the invention is adapted to be used with a conventional suitcase 10 and includes a bottom support 11, a wheel mount 12, and a pair of ground wheels 13. Detachably secured to the wheel support 12 is an elongated handle 14 which may be provided at its free end with a knob 15 or handle to facilitate wheeling the combination.

As best seen in FIG. 3, the bottom support 11 comprises an inverted U-shaped member including a pair of parallel legs 16 and a connecting cross piece 17.

Extending between the legs 16 adjacent the outer ends thereof is an elongated pivot rod 20 which is fixedly secured to said legs 16 by any convenient means.

The pivot rod 20 serves to swingably support the wheel mount 12. Said wheel mount is also generally U-shaped and comprises a pair of parallel legs 21 and an upper cross piece 22. Adjacent the free ends of the legs 21 the same are apertured to receive pivot rod 20 therethrough for swingably supporting and retaining said wheel mount relative to the bottom support 11.

Rotatably supported on the legs 21 of wheel mount 12 are a pair of elongated sleeve bearings 28 to which are fixedly secured as by welding a pair of wheel fittings which may be conveniently formed from lightweight sheet metal and bent to provide a pair of opposed cheek plates 32 as best seen in FIG. 5. Each wheel 13 is rotatably supported on a pin or axle 34 extending between said cheek plates 32 and fixedly secured thereto as by a head at each end.

The bearings 38 and the wheel fittings 30 secured thereto are held against pivot rod 20 by means of stop ring 38 fixedly secured to legs 21 in any desired fashion.

At this point it will be noted that the above described structure permits the fittings 30 and wheels 13 to be swung from the position shown in FIG. 3, wherein said fittings and wheels are coplanar with the U-shaped wheel mount 12, to an outer position wherein the fittings and wheels are in planes generally perpendicular to the plane of the wheel mount 12. Said fittings are shown in the latter position in FIGS. 2 and 5.

To open the device from the closed position of FIG. 3 the wheel fittings 30 are swung through 90° on bearings 28 to the position shown in FIG. 5. The wheel mount 12 is then swung outwardly about pivot rod 20 to the position shown in FIG. 2 and prevented from moving beyond 90° by stops 46. In order to releasably secure the wheel fittings 30 in the position of FIG. 2 a pair of inwardly extending flanges 40 are provided on the free ends of legs 16 of bottom support 11. A pair of grooves 42 are formed on flange 40 so as to receive therein the edges of the cheek plates 32 when the wheel support 12 is swung to its outer position of FIG. 2. By this structure the swinging of wheel fittings 30 about legs 21 is prevented. In order to facilitate movement of the cheek plates 22 into grooves 42 the flange 40 may be provided with a guide or cam shaped lip 44 for guiding the cheek plates into the grooves.

From the above described structure it will be apparent that the carrier may be arranged in the stored position of FIG. 3 from the working position of FIG. 2 by simply swinging the wheel mount 12 into the U-shaped bottom support 11 and then swinging the wheel fittings 30 into coplanar relationship with said support and mount. To assist in maintaining the wheel fittings 30 in coplanar relationship with the wheel mount 12 and bottom support 11 stops 46 in the form of extensions to sleeve bearings 28 may be provided to prevent said wheel fittings from swinging through the wheel mount 12 beyond the desired coplanar relationship.

In order to secure the handle 14 to the carrier the cross piece 22 of wheel mount 12 is provided with an internally threaded boss 48 which is adapted to receive the threaded end 50 of the elongated handle 14 (FIG. 2). In order to reduce the length of the handle 14 to a reasonable size for storage it may be formed in two or more sections threadedly secured together in a similar manner to that shown in FIG. 2 or by any other suitable means.

If desired a stretchable cord 54 formed to a loop may be connected to the bottom support 11 and handle 14 as indicated in FIG. 1. This may be conveniently done by welding a pair of eyes 56 on the inner side of bottom support 11 as seen in FIG. 3 and securing the opposite ends of the loop thereto. This permits the central portion of the loop to be stretched over the end of handle 14 and secured in the position seen in FIG. 1.

It will be apparent especially from FIGS. 3 and 4 that the carrier is extremely compact when arranged in stored condition and, as seen especially in FIG. 4, is sufficiently thin to permit placing the same in the side pocket of a conventional carry-on bag.

I claim:

1. A wheeled carrier for articles such as suitcases and the like comprising:

a generally U-shaped support adapted to engage one side of such article, a wheel mount swingably secured to said support and adapted to be swung from a closed nested position substantially within and coplanar with said support to an open position in a plane substantially normal to the plane of said support, a ground wheel, a fitting rotatably suppporting said ground wheel, said fitting being swingably mounted on said wheel mount for swinging said ground wheel from a working position with the plane of said ground wheel substantially normal to the plane of said wheel mount to a position coplanar with said mount, and means removably connected to said mount for manual manipulation of said mount, whereby when said means is removed said carrier may be arranged with the planes of said support, wheel mount and wheel all in coplanar relationship.

2. A carrier accoridng to claim 1 wherein said wheel mount is generally U-shaped with its leg portions generally parallel to the leg portions of said support when in said closed nested position.

3. A carrier according to claim 2 wherein said wheel mount is provided with a pair of such ground wheel fittings with each fitting swingably supported on a leg of said mount.

4. A carrier according to claim 3 wherein locking means is provided to prevent said wheel fittings from swinging relative to said leg portions of said mount when said carrier is in working position.

5. A carrier according to claim 4 wherein said locking means includes extensions on the free ends of said legs of said support, said extensions being formed complementarily to said fittings.

* * * * *